United States Patent [19]

Lema

[11] 4,026,456
[45] May 31, 1977

[54] METHOD OF ATTACHING A TUBE TO A WALL

[75] Inventor: Leo A. Lema, Racine, Wis.

[73] Assignee: Modine Manufacturing Company, Racine, Wis.

[22] Filed: Jan. 15, 1976

[21] Appl. No.: 649,567

[52] U.S. Cl. .............................. 228/136; 228/153; 29/157.4

[51] Int. Cl.² ......................................... B23K 31/02

[58] Field of Search .......... 228/135, 136, 137, 153; 29/157.3 C, 157.4; 285/209, 210, 219

[56] References Cited

UNITED STATES PATENTS

| 1,319,124 | 10/1919 | Stewart | 285/209 |
|---|---|---|---|
| 1,639,251 | 8/1927 | Arthur | 285/219 |
| 2,142,598 | 1/1939 | Allen | 29/157.4 |
| 2,907,592 | 10/1959 | Bailey | 285/219 |
| 3,467,411 | 9/1969 | Klapproth et al. | 285/219 |

Primary Examiner—Al Lawrence Smith
Assistant Examiner—K. J. Ramsey
Attorney, Agent, or Firm—Wegner, Stellman, McCord, Wiles & Wood

[57] ABSTRACT

A method of attaching a tube to a wall and particularly to an automotive radiator tank wall in a fluid tight seal in which the tube is provided with inner and outer end flanges on the end that is to be attached to the wall with these flanges spaced apart to define a groove between them substantially equal in width to the thickness of the wall so as to snugly receive the wall therein, providing a slit in the end flange extending for a distance substantially coinciding with the bottom of the groove, arranging at least one of the flange end portions on opposite sides of the slit at an outward angle to provide thereby an angled tab, providing a tube receiving opening in the wall with a slit also defining adjacent wall ends one of which is arranged at an outward angle similar to the angled flange tab, aligning the tube and the opening in the wall coaxially with the outer tube flange in contact with the tank wall at the outer surface thereof, rotating the tube and wall relative to each other thereby causing the tube outer flange tab to slide over the wall tab and pass inwardly of the wall and engage the wall and the tab groove followed by compressing the two flanges toward each other to grip tightly the wall surrounding the wall opening and then joining the tank wall as by soldering, brazing or the like to the flanges to form a fluid tight seal.

6 Claims, 4 Drawing Figures

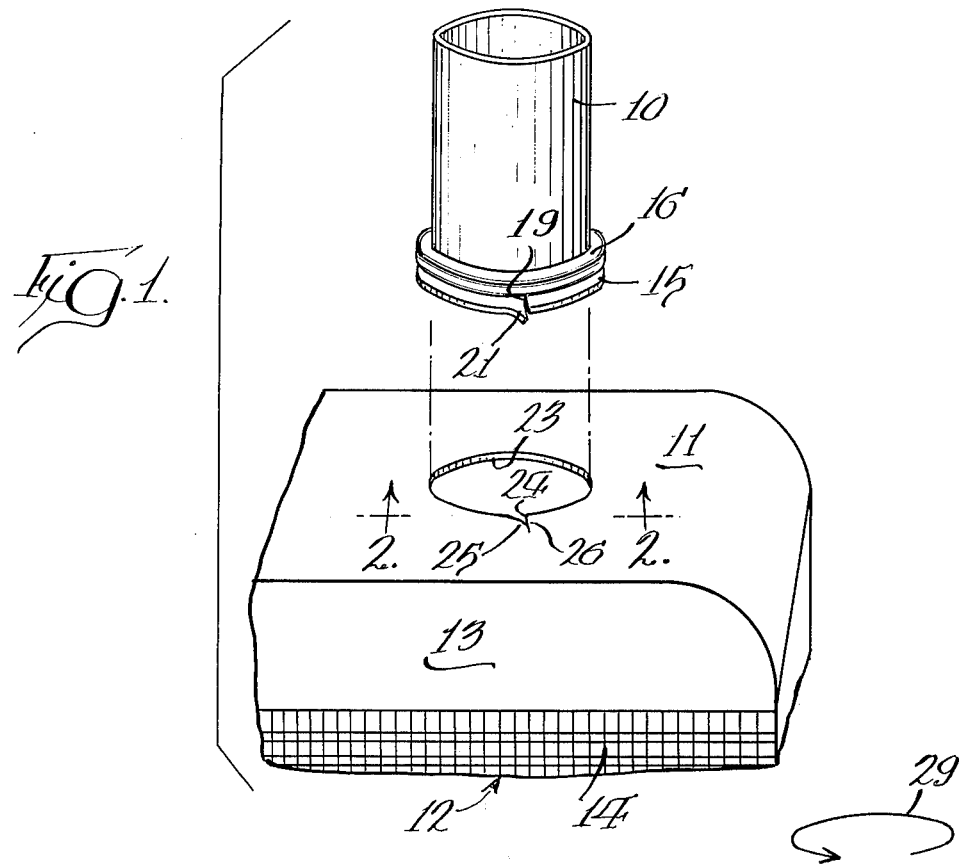
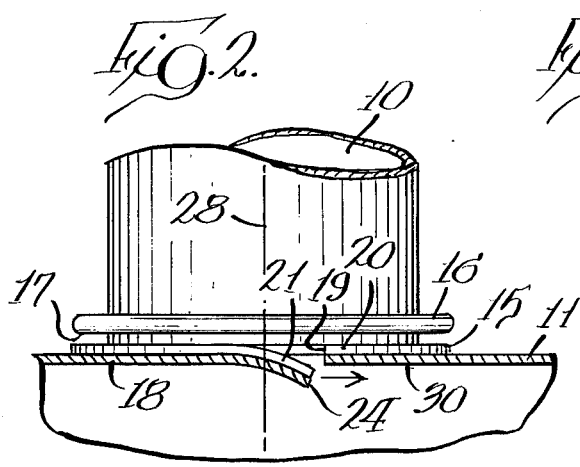
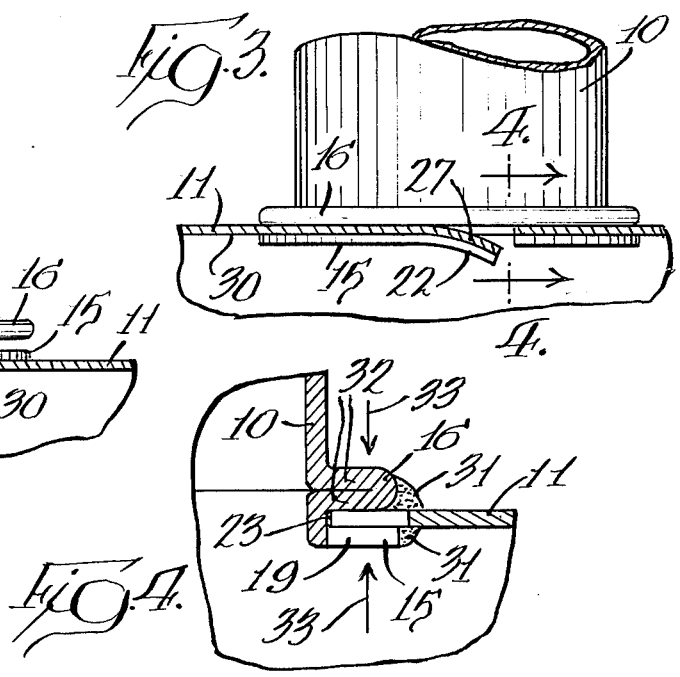

METHOD OF ATTACHING A TUBE TO A WALL

SUMMARY OF THE INVENTION

One of the features of this invention is to provide an improved method of attaching a tube to a wall such as a radiator tank wall in a fluid tight seal in which spaced flanges are provided on the end of the tube, slitting the outer or endmost flange and bending one of the portions defined by the slit outwardly to provide a screw thread construction, providing a similar slit in a tube receiving opening in the wall also angled in a similar manner and rotating the tube relative to the wall to "screw" the end flange into the wall opening and receive the wall tube between the flanges followed by flattening the tubes and permanently bonding the tube at the flanges to the wall surrounding the opening.

BRIEF DESCRIPTION OF THE DRAWINGS

FIG. 1 is a fragmentary perspective exploded view illustrating a step in the method of this invention.

FIG. 2 is a sectional view taken substantially along line 2—2 of FIG. 1 and illustrating the positions of the tank wall and tube in contact with each other preparatory to rotating the tube relative to the wall.

FIG. 3 is a view similar to FIG. 2 but illustrating the positions of the parts after the tube has been rotated through substantially 360°.

FIG. 4 is a fragmentary sectional view through the tube and wall illustrating the finished joining of the tube and wall together as viewed from the line 4—4 of FIG. 3.

DESCRIPTION OF THE PREFERRED EMBODIMENT

In the method of this invention a tube 10 is attached to a wall 11 in a fluid tight seal. The wall illustrated is that of an automotive radiator 12 upper tank 13 with the radiator having the usual air permeable core 14. The tube 10 although illustrated as a radiator filler neck for liquid coolant may, of course, be any type of tubular inlet or outlet and the invention may be used in similar installations where it is desired to attach a tube to a wall.

In the method of this invention the tube 10 is provided with outer 15 and inner 16 flanges spaced apart a distance sufficient to define a groove 17 between the flanges that is substantially equal in width or even slightly less in width than the thickness 18 of the tank wall 11 so as to grip the tank wall snugly therebetween as illustrated in FIG. 3.

The outer end flange 15 is provided with a slit 19 which is shown as radial as this is the most practical arrangement and with the slit 19 defining adjacent outer flange end portions 20 and 21, one of which 21 is arranged at an angle and thereby providing an angled tab 22 as illustrated.

The method of this invention also includes providing a tube receiving opening 23 in the wall 11 also provided with a slit 24 which is also preferably radial having wall end portions 25 and 26 on opposite sides of the slit 24.

One of these end wall portions, here shown at 25, is angled similarly to the flange tab 22 to provide a complementary wall tab 27.

In the assembly step of the method of this invention the tube 10 and wall opening 23 are aligned substantially coaxially along their common axis 28 and with the outer tube flange 15 in surface contact with the outer surface of the wall 11 surrounding the opening 23 in the manner illustrated in FIG. 2. The tube 10 and wall 11 are then rotated relative to each other which in the illustrated embodiment would be counterclockwise 29 when viewed from above thereby causing the tube flange tab 21 to slide relative to the wall 11 and enter the wall slit 24 beneath the bottom surface 30 of the tank wall. At the completion of about 360° of rotation 29 the end flange 15 is still in contact with the wall 11 but is now beneath the surface 30 as illustrated in FIG. 3.

To complete the assembly the two flanges 15 and 16 of the tube are compressed together to flatten out the tabs 22 and 27 and grip the wall 11 between them in the area surrounding the wall opening 23. This flattening can be done by any means desired such as by spanking. After this flattening the tube flanges and the wall 11 are joined together in a fluid tight joint as illustrated at 31 which may be by soldering, brazing or any other desired and customary method of joining.

As can be seen in FIGS. 2 and 3, the angles of the tabs 22 and 27 are approximately in the helix of a screw so that the rotating 29 is essentially screwing the outer end tube flange 15 into the wall opening 23. Obviously, it is preferred that the angles of these tabs be the same as this aids in sliding the inner surface of the flange 15 over the inner surface 30 of the tank wall 11. In a preferred construction as illustrated in FIG. 4 one or both of the tube flanges 15 and 16, here shown as the inner flange 16, is formed by superimposed folded portions 32 of a sheet metal tube 10. Then the compressive forces as illustrated by the arrows 33 not only grip the tank wall 11 between the flanges 15 and 17 but also compress the tube portions 32 into very close contact.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. The method of attaching a tube to a wall in a fluid tight seal, comprising: providing a said tube having outer and inner end flanges spaced apart to define a groove therebetween substantially equal in width to the thickness of said wall with the outer end flange having a slit defining adjacent outer flange end portions one of which is arranged at an outward angle to provide an angled tab; providing a tube receiving opening in said wall with a slit defining adjacent wall end portions one of which is arranged at an outward angle similar to said angled flange tab to provide a similar wall tab complementary to said flange tab; aligning said tube and opening coaxially with the outer tube flange in contact with said wall; rotating said tube and wall relative to each other thereby causing said tube outer flange tab to slide over said wall tab and enter said wall slot to engage said wall to said tube groove; continuing said rotating until said tube outer flange completely underlies said wall in the area of said opening; compressing said tube flanges toward each other to grip tightly said wall therebetween; and joining said tank wall and flanges in a fluid tight seal comprising flattening said angled tabs on said tube and said wall.

2. The method of claim 1 wherein said wall comprises an automotive radiator wall, said angled tabs of the tube and tank wall are at essentially the same angles relative to the common axis of the tank opening and the tab when said tube and opening are aligned.

3. The method of claim 2 wherein said slits are essentially radial and the tab angles each define substantially a thread of a helix.

4. The method of claim 1 wherein said joining is by soldering.

5. The method of claim 1 wherein said tube comprises sheet metal with the inner end flange being formed by superimposed folded portions of said sheet metal.

6. The method of claim 1 wherein said wall comprises an automotive radiator wall, angled tabs of the tube and tank wall are at essentially the same angles relative to the common axis of the tank opening and the tab when said tube and opening are aligned, said slits are essentially radial and the tab angles each define substantially a thread of a helix and said tube comprises sheet metal with the inner end flange being formed by superimposed folded portions of said sheet metal.

* * * * *